United States Patent
Kaul (10) Patent No.: US 8,142,101 B2
(45) Date of Patent: *Mar. 27, 2012

(54) HYDROCARBON-ADSORBING POROUS PAVEMENT STRUCTURE

(75) Inventor: Joseph B. Kaul, Lakewood, CO (US)

(73) Assignee: Reynolds Presto Products Inc., Richmond, VA (US)

( * ) Notice: Subject to any disclaimer, the term of this patent is extended or adjusted under 35 U.S.C. 154(b) by 930 days.

This patent is subject to a terminal disclaimer.

(21) Appl. No.: 11/851,714

(22) Filed: Sep. 7, 2007

(65) Prior Publication Data

US 2009/0067924 A1    Mar. 12, 2009

(51) Int. Cl.
E01C 3/00    (2006.01)

(52) U.S. Cl. .......................................... 404/31

(58) Field of Classification Search .................. 404/17, 404/27, 31, 70, 71
See application file for complete search history.

(56) References Cited

U.S. PATENT DOCUMENTS

| | | | | |
|---|---|---|---|---|
| 3,577,893 A | * | 5/1971 | Towner | 404/31 |
| 3,690,227 A | * | 9/1972 | Welty et al. | 404/2 |
| 3,958,891 A | * | 5/1976 | Eigenmann | 404/16 |
| 4,076,917 A | | 2/1978 | Swift et al. | |
| 4,797,026 A | * | 1/1989 | Webster | 404/28 |
| 5,106,227 A | * | 4/1992 | Ahmad et al. | 404/70 |
| 5,123,778 A | * | 6/1992 | Bohnhoff | 404/28 |
| 5,250,340 A | | 10/1993 | Bohnhoff | |
| 5,298,539 A | | 3/1994 | Singh et al. | |
| 5,788,407 A | * | 8/1998 | Hwang | 404/81 |
| 5,836,715 A | * | 11/1998 | Hendrix et al. | 404/134 |
| 5,848,856 A | * | 12/1998 | Bohnhoff | 405/36 |
| 5,891,938 A | | 4/1999 | Williams | |
| 6,206,607 B1 | * | 3/2001 | Medico et al. | 404/2 |
| 6,962,463 B2 | * | 11/2005 | Chen | 404/75 |
| 7,041,221 B2 | | 5/2006 | Arnott | |
| 7,168,884 B2 | * | 1/2007 | Hart | 404/29 |
| 8,025,456 B2 | * | 9/2011 | Kaul | 404/27 |
| 2009/0067925 A1 | * | 3/2009 | Kaul | 404/17 |

FOREIGN PATENT DOCUMENTS

| | | |
|---|---|---|
| DE | 651 167 | 10/1937 |
| DE | 200 00 015 | 5/2000 |
| EP | 445578 | 9/1991 |
| EP | 583086 | 2/1994 |

(Continued)

OTHER PUBLICATIONS

International Search Report, mailed Sep. 5, 2008.

(Continued)

*Primary Examiner* — Gary S Hartmann (74) *Attorney, Agent, or Firm* — Merchant & Gould, P.C.

(57) ABSTRACT

A water-pervious pavement structure comprising wearing course comprising a water-pervious combination of recycled glass and aggregate bound together with an adhesive binder and held within a plurality of connected, open grid pockets; and a layer of unbound recycled glass disposed under the wearing course capable of adsorbing contacting hydrocarbons carried with water through the wearing course. In a preferred embodiment, the wearing course comprises about 30 wt. % to about 80 wt. % recycled glass and about 20 wt. % to about 70 wt. % aggregate bound together by a cured resin binder within the grid pockets.

17 Claims, 1 Drawing Sheet

FOREIGN PATENT DOCUMENTS

| | | |
|---|---|---|
| EP | 1 462 571 | 9/2004 |
| FR | 2 653 360 | 4/1991 |
| FR | 2 653 360 A1 | 4/1991 |
| FR | 2 791 692 | 10/2000 |
| JP | 2004 076527 | 3/2004 |
| JP | 2004-76527 | 3/2004 |
| WO | WO 98/29356 | 7/1998 |

OTHER PUBLICATIONS

Saskatchewan Waste Reduction Council, "Alternate Uses for Glass," http://www.saskwastereduction.ca/glass/alternate.html (accessed Mar. 6, 2008).

International Search Report and Written Opinion mailed May 15, 2009.

* cited by examiner

HYDROCARBON-ADSORBING POROUS PAVEMENT STRUCTURE

FIELD

A heavy-duty porous pavement structure made from a composite composition of recycled glass, aggregate and an adhesive binding agent. The glass/aggregate composite is reinforced with the use of a recycled grid containing open-top pockets in various depths, depending upon the load and intended application, for receiving the combination of recycled glass, aggregate and binder. In addition to being a strong and attractive parking lot surface, the glass, aggregate, binder composite works as an effective in-situ filter of hydrocarbons to prevent groundwater contamination beneath the porous pavement structure and promote aquifer recharge. The porous pavement structure also acts as a Stormwater detention basin, thereunder, capable of holding most 25 year storm events under the porous pavement structure.

BACKGROUND

Increased concern is being given to non-point source pollution which originates from automobile fluids leaked onto pavement, such as parking surfaces and subsequently carried by contaminated, surface heated rainwater into sensitive creeks and streams. Of additional concern is the increased amount of impermeable surfaces in urban areas which limit groundwater infiltration and increase velocities of runoff, thereby damaging under-sized storm water conveyance infrastructure. Also of concern is the steady increase in non-porous black asphalt parking surfaces which increase air temperatures and add to global warming.

The present invention relates to a high strength porous pavement structure that actively filters out hydrocarbon pollutants from Stormwater, and is capable of holding the filtered water in a lower layer of recycled glass. Water carrying hydrocarbons that penetrates an upper wearing course flows into a hydrocarbon-adsorbent recycled glass layer (filtration/water storage layer).

Current technology in porous pavements is limited to using mostly virgin construction materials and does not actively filter hydrocarbons from the Stormwater prior to entering the underground aquifers. While the EPA encourages the use of porous pavements in their 1999 EPA fact sheet 11, "Porous Pavements", they express concern of using the current technology over aquifers due to potential risk of contamination from oil and grease that can be leaked from vehicles. The present invention defuses this concern by providing a porous pavement composition and structure that is able to remove hydrocarbons from water that passes therethrough so that underlying aquifer water quality is maintained.

The present invention utilizes recycled glass which is abundantly recycled, but has few commercial uses, diverting large volumes of glass from landfills. The recycled glass when mixed with aggregate and binder, creates a strong, attractive parking surface. The recycled glass actively adsorbs hydrocarbons while removing said hydrocarbons from polluted Stormwater before it enters underground aquifers. In addition to this environmental benefit, the porous parking surface will reduce flooding and promote groundwater recharge and allow for more efficient use of urban parking areas. The reflective nature of glass will also help keep the parking surface cool, reducing the urban heat island effect.

Increased water quality awareness and desire to use Green building materials make the glass, aggregate and binder composite composition unique and attractive to environmentally conscious builders. Many state and federal governments are requiring the use of building products that offer Leadership in Energy and Environmental Design (LEED) points as regulated by the United States Green Building Council (USGBC) on municipal building projects. The present invention will rate higher in LEED points than any current porous pavement technology allowing architects and owners to achieve Gold and Platinum LEED standards more easily.

SUMMARY

An upper porous pavement composition layer, also called the "wearing course", and a base layer of recycled glass thereunder, hereinafter called the "filtration/water storage layer" together are herein called the "pavement structure". The wearing course layer comprises about 30 wt. % to about 80 wt. % recycled glass; about 20 wt. % to about 70 wt. % aggregate; and about 0.2 ounce to about 5 ounces of adhesive binder per $ft^2$ of wearing course surface area. The filtration/water storage layer, disposed under the wearing layer, should be more than 80% recycled glass, preferably 100% recycled glass and optionally contains less that 20 wt. % filler, such as aggregate. The filtration/water storage layer comprises recycled glass that is not coated with binder so that it adsorbs oil and other hydrocarbons that pass through the wearing course with rain water.

A primary aspect of the present invention is to provide a porous pavement structure formed from a readily available, strong and inert recycled glass material in combination with an aggregate, such as chip seal aggregate, and a binder to form an upper wearing course portion of a porous pavement structure, and a layer of unbound recycled glass, disposed directly below the wearing course, that actively filters hydrocarbon pollutants from Stormwater that passes through the wearing course.

Another aspect of the present invention is to create a light reflecting, cool temperature parking surface to counteract the urban heat island effect. Another benefit is that the porous pavement structure described herein can be disposed over an underground Stormwater detention basin since any hydrocarbon leakage from the vehicles through the porous pavement structure will be adsorbed by the unbound recycled glass portion of the pavement structure during penetration of storm water.

DETAILED DESCRIPTION OF THE PREFERRED EMBODIMENT

The preferred porous pavement structure described herein includes an upper wearing course comprising about 30 wt. % to about 80 wt. % recycled glass; about 20 wt. % to about 70 wt. % aggregate; and about 0.2 ounce to about 5 ounces of adhesive binder per $ft^2$ of wearing course surface area. More preferably, the wearing course includes about 50 wt. % to about 70 wt. % recycled glass; about 30 wt. % to about 50 wt. % aggregate; and about 0.5 ounces to about 2 ounces of binder per ft$^2$ of wearing course surface area. In the most preferred embodiment, the wearing course has 60 wt. % recycled glass; 40% aggregate; and 1 ounce of binder per ft$^2$ of wearing course surface area.

The recycled glass/aggregate/binder composite of the wearing course should have the recycled glass and aggregate homogeneously mixed such that there is a surface percentage of recycled glass and surface percentage of aggregate that is within about 10 wt. % of the overall percentage of recycled glass and aggregate that forms the wearing course. In the preferred embodiment, the wearing course has a compressive strength of at least about 800 psi, more preferably at least about 900 psi.

The wearing course is provided with sufficient strength and stability for years of structural integrity by disposing the recycled glass/aggregate/binder composition in a metal, ceramic, or polymeric grid structure, such as that described in Bohnhoff U.S. Pat. No. 5,250,340, hereby incorporated by reference. Other suitable grid structures are available and are useful having depths of about 1 inch to about 10 inches. Preferred grid structures include interconnected pockets or grids having shaped reservoirs that are open at their upper surfaces for receiving the recycled glass/aggregate/binder composition, and are liquid-porous at their bottom surfaces, but include structure, such as an underlying water-pervious felt or mat (woven or non-woven) layer, or contain horizontal bottom cross or grid structure that will retain the recycled glass/aggregate/binder composition within the pockets. Alternatively, a separate mesh, e.g., metal or plastic, preferably plastic, can be disposed under the grid structure pockets. The grids or pockets that are filled with the wearing course composition preferably should have dimensions (in any shape) that measure about 1 in$^2$ to about 30 in$^2$ (regardless of depth), e.g., 3 inch by 3 inch squares, in their open top surface area to provide sufficient strength and stability to the wearing course composition.

The recycled glass is glass that has been crushed, tumbled and heated to round its edges and remove non-glass impurities. A suitable recycled glass is described in Arnott U.S. Pat. No. 7,041,221, which is hereby incorporated by reference. Waste glass is prepared by crushing the glass to desired dimensions, e.g., 1/16 inch to about 1 inch, preferably about 1/4 inch to about 1/2 inch, more preferably about 3/8 inch.

The glass may be crushed using an impact crusher, hammer mill, cone crusher or a roller crusher. Preferably, the recyclable glass is crushed using roller crusher. Inventor has further observed that better oil adsorption occurs when the glass is crushed using a roller crusher.

Any order of pre-crushing, pre-screening, crushing, cleaning and drying may be used. In a preferred embodiment however, the crushed glass is first pre-crushed and pre-screened. If the glass is clean, no pre-crushing or pre-screening is required. The pre-crushed glass is pre screened through a mesh, which may include an inch mesh, a combination of double or triple deck screens or at least two meshes. Once pre-screened through the mesh, preferably the glass is further crushed using a roller crusher and subsequently, the crushed glass is dried, after cleaning, preferably at a temperature of at least 100° F. or, more preferably, at a temperature of at least 350° F. Subsequently, the crushed glass is screened, preferably through at least a 40 mesh screen, or more preferably through a 30 mesh screen, or most preferably through a 20 mesh screen.

The crushed, screened and heated recycled glass is washed prior to applying the binder to its surfaces in forming the wearing course of the pavement structure. The binder preferably is applied to an upper surface of the wearing course after filling a grid structure with the mixture or recycled glass and aggregate that is disposed over a filtration/water storage layer of clean recycled glass that contains no binder or other coating material. The binder preferably is applied to the surface of the recycled glass/aggregate wearing course by spraying, but any other method, e.g., pouring binder over the upper surface of the wearing course also is effective to provide sufficient binding of contacting or closely adjacent glass and aggregate binding surfaces to bind the recycled glass to contacting or closely adjacent aggregate and/or other glass particles. Alternatively, the glass and aggregate can be mixed together and the binder applied to the mixture, prior to filling the grid pockets, or the binder can be applied only to the aggregate prior to mixing the recycled glass and aggregate.

One wearing course composition included 60 wt. % recycled glass and 40 wt. % aggregate in a plastic (polymeric grate) having adjacent pockets having a 9.0 in$^2$ horizontal cross-sectional area (3 inch by 3 inch squares) and a depth of 2 inches, using a sprayed epoxy resin and curing agent at 1 ounce of epoxy resin per ft$^2$ of wearing course surface area, cured for 72 hours. The binder penetrated the wearing course composition approximately the full 2 inches of wearing course depth, but would not have penetrated further so that an underlying filtration/water storage layer of recycled glass would retain maximum hydrocarbon adsorbency. The above-described wearing course produced the following strength data:

| width | length | area of specimen | area of piston | gauge | strength |
| --- | --- | --- | --- | --- | --- |
| 6.6 inches | 13.1 inches | 865 in$^2$ | 9.6 in$^2$ | 8427 psi | 936 psi |

Adhesive Binders

Any known polymeric binder is suitable for binding the recycled glass to the aggregate to manufacture the wearing course composition described herein. Suitable adhesive resin binders including epoxy binders, e.g., Bisphenol A and Bisphenol F based epoxies; phenoxy resins; polyester resins; vinyl ester resins; phenolic resins; novolac resins; phenol/novolac resins; polyamide, e.g., nylon resins; and the like. The epoxy resins are preferred since they have the highest adhesion values. Known suitable curing agents and/or polymerization accelerators are added to the articles when disposed into the desired shape.

The basalt-containing coatings and ballistic shields described herein can be admixed with all market available epoxy resin systems. Examples of suitable epoxy resins include: bisphenol A-derived resins, epoxy cresol novolac resins, epoxy phenol novolac resins, and the like.

In general, suitable epoxy and phenoxy resins are aliphatic-, cycloaliphatic-, or aromatic-based epoxy resins, such as, for example, epoxy resins represented by structural formulae I and II:

wherein in each A is, independently, a divalent hydrocarbyl group having 1 to about 12, preferably 1 to about 6, and most preferably 1 to about 4, carbon atoms; each R is, independently, hydrogen or an alkyl group having 1 to about 3 carbon atoms; each X is, independently, hydrogen, a hydrocarbyl or hydrocarbyloxy group having 1 to about 12, preferably 1 to about 6, and most preferably 1 to about 4, carbon atoms, or a halogen atom, preferably chlorine or bromine; n is 0 or 1, and n' has an average value of about 2 to about 30, and preferably 10 to about 30.

In particular, the preferred epoxy and phenoxy resins are the (diglycidyl ether/bisphenol-A) resins, i.e., polyether diepoxides prepared by the polymeric adduction of bisphenol-A (III)

and the di-glycidyl ether of bisphenol-A (IV).

In this case, the epoxy resin is a mixture including polymeric species corresponding to different values of n' in the following idealized formula V:

wherein n' is a number from about 2 to about 30.

In addition to bisphenol-A, useful epoxy and phenoxy resins can be prepared by reacting a diglycidyl ether of a bisphenol listed below with an exemplary, but non-limiting, bisphenol listed below:

-continued

Other epoxy resins that can be used as the adhesive resin for the basalt powder-containing compositions described herein are prepared from the following starting epoxy-containing materials. These epoxy-containing materials are reacted with bisphenol-A or another bisphenol to adjust the molecular weight of the epoxy resin, as desired.

Epoxy novolac resins useful in making the compositions described herein include polyfunctional epoxy resins having an epoxy functionality of at least about 2, and preferably greater than about 2, to about 6, and preferably greater than about 2 to about 5. The epoxy novolac resins include low molecular weight resins having an epoxide equivalent weight (EEW) of about 100 to about 220, and preferably an EEW of about 150 to about 210.

Epoxy novolac resins include for example, but are not limited to, epoxy phenol novolac resins. Epoxy phenol novolac resins are represented by general structural formula (VI) wherein n is about 0.2 to about 4.

(VI)

The multifunctional epoxy phenol novolac resins contain a phenolic hydroxyl group per phenyl ring in random para-para', ortho-para', and ortho-ortho' combinations. Epoxidation with epichlorohydrin yields the highly functional epoxy phenol novolac resins. The epoxy phenol novolac resin can be a high viscosity liquid (i.e., n about 0.2) or a solid (i.e., n greater than 3).

Non-limiting examples of epoxy phenol novolac resins useful as the adhesive resin binders are ARALDITEL® EPN 1139 available from CIBA-GEIGY Corp., Hawthorne, N.Y., and D.E.N. 431, available from Dow Chemical Co., Midland, Mich. These epoxy phenol novolac resins have an n value (from structural formula I) of 0.2, an EEW of 175 and an epoxy functionality of 2.2. Other non-limiting examples of epoxy phenol novolac resins are D.E.N. 438 and ARALDI-TEL® EPN 1138, available from Dow Chemical Co. and CIBA-GEIGY Corp., respectively, and having an n value of 1.6, an EEW of 178 and an epoxy functionality of 3.6; and D.E.N. 439 available from Dow Chemical Co. and having an n value of 1.8, an EEW of 200 and an epoxy functionality of 3.8.

Another useful class of epoxy novolac resins is the epoxy cresol novolac resins depicted in general structural formula (VII), wherein n is about 1.7 to about 4.4.

(VII)

The epoxy cresol novolac resins are prepared by glycidylation of o-cresol-formaldehyde condensates in the same manner as the epoxy phenol novolac resins. The epoxy functionality of the epoxy cresol novolac resins is about 2.7 to about 5.4.

Other useful epoxy novolac resins, i.e., polyfunctional epoxy resins, include but are not limited to a polynuclear phenol-glycidyl ether resin, such as the tetraglycidyl ether of tetrakis(4-hydroxyphenyl)ethane depicted in structural formula (VIII), and having an EEW of about 185 to about 210 and a theoretical epoxy functionality of four.

(VIII)

A tetraglycidylmethylenedianiline resin exemplified in structural formula (IX), as N,N,N',N'-tetraglycidyl-4,4'-diaminophenylmethane, having an EEW of about 117 to about 133 and an epoxy functionality of about 4 also can be used as the epoxy novolac resin.

An epoxy novolac resin provides a sufficient number of cross-linking sites such that the resulting anhydride-cured epoxy nanocomposite composition is rigid and has an unexpectedly high Tg.

Any curing agent, e.g., an amine or anhydride curing agent, can be used to cure the above-described epoxy resins. Some of the available anhydride curing agents for epoxies, together with their suggested cure schedule, are listed in Table I:

(IX)

In addition, triglycidyl p-aminophenol resins, available from CIBA-GEIGY Corp., and having an EEW of about 105 to about 114 and an epoxy functionality of about 3 can be used as the epoxy novolac resin.

Another exemplary epoxy novolac resin is a triglycidyl isocyanurate depicted in structural formula (X) and having an epoxy functionality of about 3 and an EEW of about 108.

| CURING AGENT | SUGGESTED CURE SCHEDULE |
| --- | --- |
| Nadic methyl anhydride (NMA) | 2 hours at 90° C.[+] 4 hours at 165° C.[+] 16 hours at 200° C.[+] |
| Hexanhydrophthalic anhydride (HHPA) | 2 hours at 100° C.[+] 1-6 hours at 150° C.[+] |
| Trimellitic anhydride (TMA) | 24 hours at 150-180° C.[+] |
| Docecenyl succinic anhydride (DDSA) | 2 hours at 100° C.[+] 4-6 hours at 150° C.[+] |
| Phthalic anhydride (PA) | 24 hours at 120° C.[+] 8 hours at 150° C.[+] |
| Methyl hexahydrophthalic anhydride (MHHPA) | 3 hours at 100° C.[+] 6 hours at 140° C.[+] |
| Tetrahydrophthalic anhydride (THPA) | 24 hours at 120° C.[+] 8 hours at 150° C.[+] |
| Methyl tetrahydrophthalic anhydride (MTHPA) | 2 hours at 90° C.[+] 4 hours at 150° C.[+] |

Flexible epoxies are available from a variety of commercial sources including Shell Co., Ciba, and The Dow Chemical.

Bisphenol A type EPON-828 (Shell Co.), is an epoxy resin precursor with the bisphenol A structure and a molecular weight of 380, and has the formula:

Epon 828 (Shell)

wherein n=0 (88%); n=1 (10%); n=2 (2%).

Bisphenol-A type. DER 331 (Dow Chemical Co., Midland, Mich.), is an epoxy polymer precursor and is an analog to Epon-828 having the formula:

Bisphenol-F type. DER 354 (Dow Chemical Co.) is an epoxy polymer precursor having the formula:

Novolac type. DER 43. DER 438 and DER 439 (Dow Chemical Co.) are epoxy polymer precursors having the formula:

wherein n is between about 0.2 and 1.8.

Epoxy polymer, DER 732 (Dow Chemical Co.) is an epoxy resin precursor of the general formula:

There are numerous other types of epoxy polymer precursors which are suitable and which are well known to those skilled in the art.

Amine curing agents are the preferred curing agents used to cure the epoxy resin precursors into a flexible epoxy resin. The most preferred curing agents are polyoxypropylene di- or triamines which are sold as JEFFAMINES. Huntsman Chemical Company, Austin, Tex. Most preferred are the polyoxypropylene diamines (D-series) of the formula:

wherein x is between about 4 and 40.

The preferred diamines when sued as curing agents for the epoxy resin precursors produce a glass transition temperature of less than ambient temperatures (25° C.) and preferably less that 0° C. As a result, when cured to a pristine epoxy resin while in contact with the basalt particles, the resins are flexible when x is between about 4 and 40 in the polyoxypropylene diamine. The cured epoxy resin is also elastic.

The T series JEFFAMINES can be used. These are wherein x+y+z is between about 4 and about 120.

Various other epoxy resin curing agents, such as amides, can be used. The amide curing agents are for instance wherein x is between about 5 and 15.

Examples of other suitable adhesive resins include: binders comprising carboxylic acid and anhydride polymers and β-hydroxyalkylamides as crosslinkers. The molar ratio of carboxyl groups to hydroxyl groups is preferably 1:1. Examples are described in U.S. Pat. No. 4,076,917, incorporated herein by reference. Other suitable adhesive binders are mixtures of high molecular weight polycarboxylic acids and polyhydric alcohols, alkanolamines or polyacid amines. Suitable high molecular weight polycarboxylic acids are polyacrylic acid, copolymers of methyl methacrylate/n-butyl acrylate/methacrylic acid and of methyl methacrylate/methacrylic acid. The polyhydric alcohols and alkanolamines include 2-hydroxymethyl-1,4-butanediol, trimethylolpropane, glycerol, poly(methylmethacrylate-co-hydroxypropyl acrylate), diethanolamine and triethanolamine. Maleic acid can be included as a possible comonomer for preparing the high molecular weight polycarboxylic acids. Additional examples of these adhesive binders are described in EP 445 578, incorporated herein by reference.

Suitable formaldehyde-free aqueous binders are described in EP 583 086, incorporated herein by reference. These binders require a phosphorus-containing reaction accelerant to provide adequate reinforcing fiber web strengths. The binders comprise a polycarboxylic acid having at least 2 carboxyl groups and optionally also anhydride groups. Polyacrylic acid is preferred, but copolymers of acrylic acid with maleic anhydride are also useful. The binder further comprises a polyol, for example glycerol, bis[N,N-di(β-hydroxyethyl) adipamide, pentaerythritol, diethylene glycol, ethylene glycol, gluconic acid, β-D-lactose, sucrose, polyvinyl alcohol, diisopropanolamine, 2-(2-aminoethylamino)ethanol, triethanolamine, tris(hydroxymethylamino)methane and diethanolamine. A phosphorus-containing reaction accelerant is omitable only if a highly reactive polyol is used such as β-HHHydroxyalkylamides.

Additional examples of useful adhesive binders for the basalt particles in the coatings and panels described herein include a condensation product of a methylene donor and a methylene acceptor, either pre-condensed, or condensed in-situ while in contact with the basalt particles. The term "methylene donor" is intended to mean a compound capable of reacting with a methylene acceptor (such as resorcinol or its equivalent containing a reactive hydroxyl group) and generate the resin outside of contact with the basalt particles, or in-situ. Preferably, the components of the condensation product include a methylene acceptor and a methylene donor. The most commonly employed methylene acceptor is a phenol, such as resorcinol, while the most commonly employed methylene donor is a melamine, such as N-(substituted oxymethyl)melamine. The effect achieved is resin formation in-situ while in contact with the basalt particles, creating a bond between the basalt particles, irrespective of whether the basalt particles have been pretreated with an additional adhesive, such as a polyepoxides or the like. Examples of other methylene donors which are suitable for use in the basalt powder compositions described herein include melamine, hexamethylenetetramine, hexaethoxymethylmelamine, hexamethoxymethylmelamine, lauryloxymethyl-pyridinium chloride, ethoxy-methylpyridinium chloride, trioxan hexamethoxy-methylmelamine, the hydroxyl groups of which may be esterified or partly esterified, and polymers of formaldehyde, such as paraformaldehyde. In addition, the methylene donors may be N-substituted oxymethylmelamines, of the general formula:

wherein X is an alkyl having from 1 to 8 carbon atoms $R^3$, $R^4$, $R^5$, $R^6$ and $R^7$ are individually selected from the group consisting of hydrogen, an alkyl having from 1 to 8 carbon atoms and the group —CH$_2$OX. Specific methylene donors include hexakis (methoxymethyl)melamine; N,N',N"trimethyl/N,N', N"-trimethylol-melamine; hexamethylolmelamine; N,N',N"-dimethylolmelamine; N-methylol-melamine; N,N'-dimethylolmelamine; N,N',N"-tris(methoxymethyl)melamine; and N,N',N"-tributyl-N,N',N"-trimethylol-melamine. The N-methylol derivatives of melamine are prepared by known methods.

The amount of methylene donor and methylene acceptor, pre-condensed or condensed in-situ, that are present in the basalt powder composition may vary. Typically, the amount of pre-condensed methylene donor and methylene acceptor is present will range from about 0.1% to about 15.0%; or each can be added separately in an amount of about 0.1% to about 10.0%, based on the weight of basalt powder in the composition. Preferably, the amount of each of a methylene donor and methylene acceptor added for in-situ condensation ranges from about 2.0% to about 5.0%, based on the weight of basalt powder in the composition, to obtain the maximum basalt content for greater ballistic protection.

The weight ratio of methylene donor to the methylene acceptor may vary. Generally speaking, the weight ratio will range from about 1:10 to about 10:1. Preferably, the weight ratio ranges from about 1:3 to 3:1.

Resorcinol-free adhesive resins also are useful in the basalt compositions described herein. For example, U.S. Pat. No. 5,298,539, incorporated herein by reference, discloses at least one additive selected from the group consisting of derivatives of melamine, acetoguanamine, benzoguanamine, cyclohexylguanamine and glycoluril monomer and oligomers of these monomers. These derivatives are substituted on average at two or more positions on the monomer or each unit of the oligomer with vinyl terminated radicals and the composition is free of resorcinol.

Other resorcinol-free adhesive resins and adhesive compounds that are useful in the basalt compositions include those described in U.S. Pat. Nos. 5,891,938 and 5,298,539, both hereby incorporated by reference. The '938 patent discloses a self-condensing alkylated triazine resin having high imino and/or methylol functionality. U.S. Pat. No. 5,298,539 discloses substituted derivatives based on cyclic nitrogen compounds such as melamine, acetoguanamine, cyclohexylguanamine, benzoguanamine, and similar alkyl, aryl or aralkyl substituted melamines, glycoluril and oligomers of these compounds. In particular, the adhesive resins and adhesive compounds which are useful as the adhesive resins in the basalt compositions described herein include the following: adhesive resins selected from the group consisting of derivatives of melamine, acetoguanamie, benzoguanamine, cyclohexylguanamine and glycoluril monomers and oligomers of these monomers, which have been substituted on average at two or more positions on the monomer or on each unit of the oligomer with vinyl terminated radicals, the adhesive being free of resorcinol; and, these derivatives which have been further substituted on average at one or more positions with a radical which comprises carbamylmethyl or amidomethyl.

Further, the adhesive resin can be any of the compounds of the following formulas:

and positional isomers thereof,
wherein, in each monomer and in each polymerized unit of the oligomers, Y is selected from methyl, phenyl and cyclohexyl, and, on average,
at least two R are —CH$_2$—R$^1$,
and any remaining R are H, and
at least 2 R$^1$ are radicals selected from $CH_2$=C(R$^2$)—C(O)—O—, $CH_2$=C(R$^2$)—C(O)—Z, $CH_2$=C(R$^2$)—C(O)—NH—, and $CH_2$=C(R$^2$)—CH$_2$—O—, wherein R$^2$ is hydrogen or C$_1$-C$_{18}$ alkyl, and Z is a radical selected from

—O—CH$_2$—CH$_2$—O—,

—O—CH$_2$—CH(CH$_3$)—O—,

—O—CH$_2$—CH$_2$—CH$_2$O—, and

—O—CH(C$_2$H$_5$)—O—, and any remaining R$^1$ radicals are selected from

—O—R$^3$,

—NH—C(O)—OR$^4$, and

—NH—C(O)—R$^4$, and wherein R$_3$ is hydrogen or R$_4$, and
R$_4$ is a C$_1$-C$_{18}$ alkyl, alicyclic, hydroxyalkyl, alkoxyalkyl or aromatic radical, and in the oligomers,
P is 2 to about 10, and L is methylene or the radical

—CH$_2$—O—CH$_2$—.

These adhesive compounds are particularly useful, wherein on average at least one R$^1$ in each monomer or in each oligomerized unit is —NH—C(O)—OR$^4$, particularly the compounds of the following formulas:

Particularly useful adhesive resins include the above formulas wherein on average, at least one R radical in each monomer or in each oligomerized unit is

—CH$_2$=NH—C(O)—OR$^4$, wherein R$^4$ is a C$_1$-C$_{18}$ alkyl, alicyclic, hydroxyalkyl, alkoxyalkyl or aromatic radical, and wherein, on average, at least two R radicals are selected from $CH_2$=C(CH$_3$)—C(O)O—C$_3$H$_6$—O—CH$_2$— and $CH_2$=CH$_2$—C(O)O—C$_2$H$_4$—O—CH$_2$— and at least one R radical is selected from

—CH$_2$=NH—C(O)—O—CH$_3$, and

—CH$_2$=NH—C(O)—O—C$_3$H$_7$—.

These adhesive resins and compounds can include additional additives, particularly those selected from hydroxymethylated and alkoxymethylated (alkoxy having 1-5 carbon atoms) derivatives of melamine, acetoguanamine, benzoguanamine, cyclohexylguanamine and glycoluril and their oligomers.

Additional adhesive resins useful in the recycled glass/aggregate wearing couse compositions described herein include self-condensing alkylated triazine resins selected from the group consisting of (i), (ii), and (iii):

(i) a self-condensing alkylated triazine resin having at least one of imino or methylol functionality and represented by formula (I)

(I)

(ii) an oligomer of (i), or
(iii) a mixture of (i) and (ii), wherein
Z is —N(R)(CH$_2$OR$^1$), aryl having 6 to 10 carbon atoms, alkyl having 1 to 20 carbon atoms or an acetyl group,
each R is independently hydrogen or —CH$_2$OR$^1$, and
each R$^1$ is independently hydrogen or an alkyl group having 1 to 12 carbon atoms,
provided that at least one R is hydrogen or —CH$_2$OH and at least one R$^1$ is selected from the alkyl group; and
wherein the basalt powder-containing composition is substantially free of methylene acceptor coreactants.

These adhesive resins are particularly useful wherein at least one R group is hydrogen and/or wherein at least one R$^1$ group is a lower alkyl group having 1 to 6 carbon atoms, particularly where the adhesive resin is a derivative of melamine, benzoguanamine, cyclohexylguanamine, or acetoguanamine, or an oligomer thereof.

One particularly useful alkylated triazine adhesive resin of the above formula is wherein Z is —N(R)(CH2OR1).

The compositions containing an adhesive such as a cobalt salt of an organic acid, hydroxybenzoic acid, and resorcinol, also function to increase the adhesion between the basalt powder particles.

Another adhesive resin useful herein, is N-(substituted oxymethyl)melamine and at least one of α- or β-naphthol. This adhesive resin employs the monohydric phenols, α- or β-naphthol, as methylene acceptors in the resin forming reaction during vulcanization in the absence of resorcinol.

Another suitable class of adhesive resins useful herein to adhere the recycled glass and aggregate particles together, are those which are applied in multi-stage processes, for instance a blocked isocyanate being applied in combination with poly-epoxide and the material then being treated using customary resorcinol-formaldehyde resins. Additional useful adhesive resins include, for example, a reaction product of triallyl cyanurate, resorcinol and formaldehyde or p-chlorophenol, resorcinol and formaldehyde.

Other suitable adhesive resins include polyurethane resins, phenol aldehyde resins, polyhydric phenol aldehyde resins, phenol furfural resins, xylene aldehyde resins, urea formaldehyde resins, melamine formaldehyde resins, alkyd resins, polyester resins, and the like.

Preferred Construction of Pavement Structure

Figure 1:
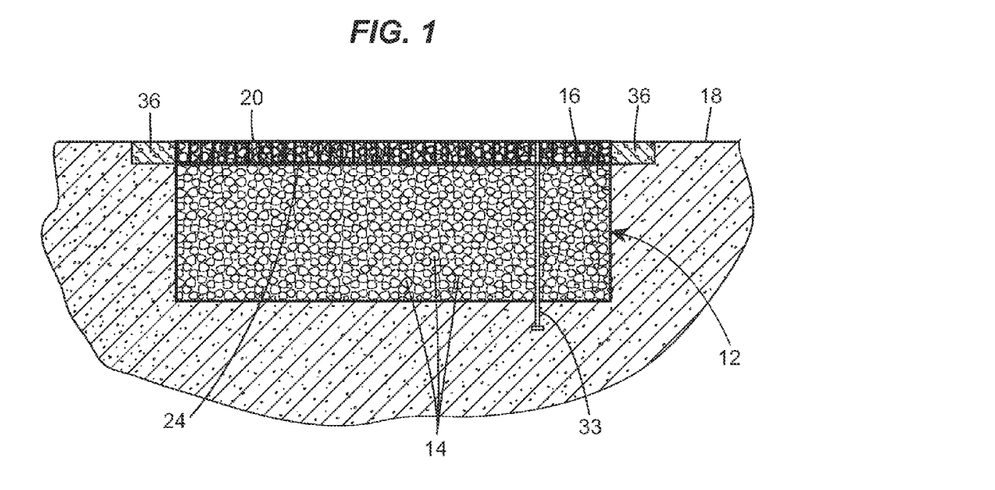
FIG. 1 is a cross sectional view of a porous pavement structure, taken along the line 1-1 of FIG. 2, including a lower layer of unbound recycled glass (filtration/water storage layer) that is overlaid by a porous pavement composite composition that fills a geosynthetic grid structure (wearing course) showing the grid strucute anchored to the prepared subgrade with an anchor, such as rebar, extending through the filtration/water storage layer.
Figure 2:
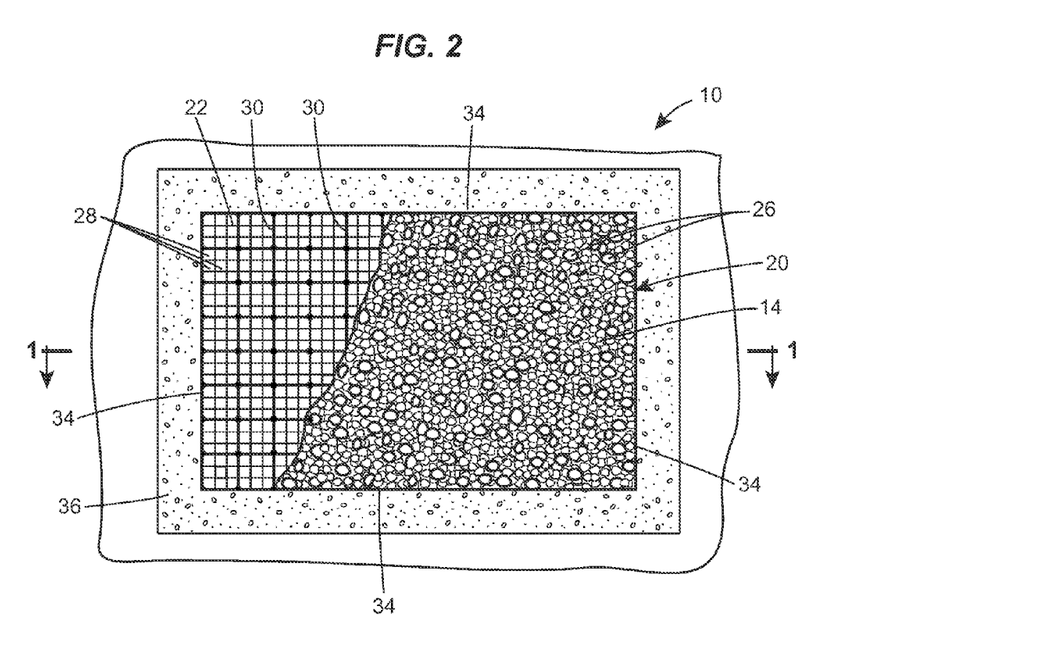
FIG. 2 is a partially broken-away top view of the porous pavement structure of FIG. 1.

Referring now to the drawings showing the porous pavement structure 10, the filtration/water storage lower layer 12 of recycled glass particles 14 is deposited in a defined, excavated area 16 in a soil surface 18 in a desired depth, e.g., 2 inches to about 30 inches, preferably about 12 inches, compacted to at least 90%, preferably at least 95% Modified Proctor (ASTM D1557) before applying the wearing course 20 thereover. Before laying the grid structure 22 on the recycled glass lower layer 12 (filtration/water storage layer), preferably a fabric or plastic mesh 24 is disposed over the recycled glass layer 12 to hold the recycled glass particles 14, aggregate particles 26 and binder composition of the wearing course 20 in place within the grid structure 22. The preferred grid structure is GEO-BLOCK® of Presto Products Company having a 2 inch height of individual, adjacent 3 inch by 3 inch rectangular pockets 28 of adjacent interlocking grid units 30 of semi-rigid high density polyethylene. The GEOBLOCK® grid units 30 then are interlocked together to create an integral holding structure for the recycled glass/aggregate/binder wearing course 20 composition forming an upper portion of the pavement structure 10 having the desired dimensions. Optionally, the grids 30 may be anchored to the soil with spaced anchors 33.

In accordance with a preferred embodiment, the wearing course 20, disposed over the filtration/water storage layer 12 of recycled glass particles 14, is supported at its edges 34 or perimeter with a structural border material, such as cement border 36, so that vehicle traffic on the wearing course 20 edges 34 does not force separation of the bound recycled glass/aggregate composition from the grid pockets 28 at the edges 34 of the pavement structure 10.

After the grid structure 22 is disposed over the plastic mesh or fabric 24, the grids 30 are filled with a homogeneous mixture of recycled glass particles 14 and aggregate particles 26 that is compacted in the grids 30, in individual, adjacent grid pockets 28, and then coated from the upper surface, e.g., by spraying, with an adhesive binder. Sufficient adhesive binder is applied to the surface of the recycled glass/aggregate wearing course 20 composition so that at least an upper portion of 1 to 6 inches of wearing course 20, preferably at least about 2 inches, includes adhesive binder adhering together adjacent recycled glass particles 14 and aggregate particles 26. Any portion of the wearing course recycled glass particles 14 that is not coated with adhesive binder will act as an additional hydrocarbon adsorbent for adsorbing hydrocarbons from rain water passing through the wearing course 20, in addition to the lower, compacted layer 12 of unbound recycled glass particles 14 (the lower filtration/water storage layer).

The adhesive binder applied to upper surface of the wearing course 20 should include sufficient curing agent to fully cure the binder within about 72 hours. The curing agent can be mixed into the adhesive binder prior to application, or it can be applied, e.g., sprayed onto the wearing course, after applying the adhesive binder.

What is claimed:

1. A water-pervious pavement structure comprising:
   (a) wearing course comprising a water-pervious combination of recycled glass particles and aggregate particles bound together with an adhesive binder and held within a plurality of connected, open grid pockets; and
   (b) a layer of unbound recycled glass disposed directly under the wearing course capable of adsorbing contacting hydrocarbons carried with water through the wearing course.

2. The pavement structure of claim 1, wherein the wearing course comprises about 30 wt. % to about 80 wt. % recycled glass and about 20 wt. % to about 70 wt. % aggregate bound together by a cured resin binder within the grid pockets.

3. The pavement structure of claim 2, wherein the resin binder is present on an upper surface of the wearing course in an amount in the range of about 0.2 ounce to about 10 ounces per ft$^2$ of wearing course surface area.

4. The pavement structure of claim 3, where the resin binder is present on the upper surface of the wearing course in an amount in the range of about 0.5 ounces to about 5 ounces per ft$^2$ of wearing course surface area.

5. The pavement structure of claim 1, wherein the wearing course has a compressive strength of at least 800 psi.

6. The pavement structure of claim 5, wherein the wearing course has a compressive strength of at least 900 psi.

7. The pavement structure of claim 1, wherein the layer of unbound recycled glass disposed under the wearing course has a thickness and a void space between unbound recycled glass particles to provide a detention basin for storm water that penetrates the wearing course.

8. The pavement structure of claim 1, wherein the aggregate is chip seal aggregate.

9. The pavement structure of claim 1, including a stormwater detention basin disposed directly below the layer of unbound recycled glass.

10. The pavement structure of claim 1, wherein the recycled glass particles have a size in the range of about 1/16 inch to about 1 inch.

11. The pavement structure of claim 1, wherein the recycled glass particles have a size in the range of about 1/4 inch to about 1/2 inch.

12. The pavement structure of claim 1, wherein the aggregate particles have a size in the range of about 1/16 inch to about 1 inch.

13. The pavement structure of claim 1, wherein the aggregate particles have a size in the range of about 1/4 inch to about 1/2 inch.

14. The pavement structure of claim 11, wherein the aggregate particles have a size in the range of about 1/4 inch to about 1/2 inch.

15. The pavement structure of claim 14, wherein both the glass particles and the aggregate particles have a size of about 3/8 inch.

16. The pavement structure of claim 3, wherein the resin binder is applied on the upper surface of the wearing course in an amount in the range of about 0.5 ounces to about 5 ounces per $ft^2$ of wearing course surface area.

17. The pavement structure of claim 1, wherein the wearing course further comprises a fabric layer beneath the open grid pockets.

* * * * *